(12) United States Patent
Jeong et al.

(10) Patent No.: US 11,225,732 B2
(45) Date of Patent: Jan. 18, 2022

(54) MECHANOLUMINESCENT FIBER AND METHOD OF MANUFACTURING THE SAME

(71) Applicant: DAEGU GYEONGBUK INSTITUTE OF SCIENCE & TECHNOLOGY, Daegu (KR)

(72) Inventors: Soon Moon Jeong, Daegu (KR); Seong Kyu Song, Daegu (KR); Sang Kyoo Lim, Daegu (KR)

(73) Assignee: DAEGU GYEONGBUK INSTITUTE OF SCIENCE & TECHNOLOGY, Daegu (KR)

( * ) Notice: Subject to any disclaimer, the term of this patent is extended or adjusted under 35 U.S.C. 154(b) by 142 days.

(21) Appl. No.: 16/127,937

(22) Filed: Sep. 11, 2018

(65) Prior Publication Data

US 2019/0078237 A1 Mar. 14, 2019

(30) Foreign Application Priority Data

Sep. 11, 2017 (KR) .......................... 10-2017-0116144

(51) Int. Cl.
*D01F 8/18* (2006.01)
*C09K 11/77* (2006.01)
(Continued)

(52) U.S. Cl.
CPC ............ *D01F 8/18* (2013.01); *C09K 11/7705* (2013.01); *D01D 5/253* (2013.01); *D01D 11/06* (2013.01);
(Continued)

(58) Field of Classification Search
CPC ............ D10B 2101/00; D10B 2401/20; D01D 5/253; C09K 11/7706; D06P 1/5292; D06P 1/0012; D01F 8/18
See application file for complete search history.

(56) References Cited

U.S. PATENT DOCUMENTS 8,207,511 B2 6/2012 Bortz et al.
2018/0030622 A1* 2/2018 Masuda ................. D03D 15/00

FOREIGN PATENT DOCUMENTS

JP 3083388 B2 * 9/2000
JP 2005-325459 A 11/2005
(Continued)

OTHER PUBLICATIONS

Machine Translation of WO2015190661 (Year: 2015).*
(Continued)

*Primary Examiner* — Peter Y Choi
*Assistant Examiner* — Jenna N Chandhok
(74) *Attorney, Agent, or Firm* — Lex IP Meister, PLLC (57) ABSTRACT

Provided is a method of manufacturing a mechanoluminescent fiber. The method includes the steps of: preparing an elastic fiber having a longitudinal groove on the surface thereof; forming a primer layer including a coupling agent on the elastic fiber; filling the groove of the elastic fiber with a mixture of a stress transfer substance and a stress luminescent substance; and forming a silicon adhesive layer on the elastic fiber of which the groove is filled with the mixture of a stress transfer substance and a stress luminescent substance. The silicon adhesive layer is 3-dimensionally bonded to the elastic fiber and the mixture of a stress transfer substance and a stress luminescent substance.

7 Claims, 6 Drawing Sheets

(51) Int. Cl.
    *D01D 5/253* (2006.01)
    *D01D 11/06* (2006.01)
    *D06P 1/52* (2006.01)
    *D06P 1/00* (2006.01)
    *D06P 1/673* (2006.01)
    *D06P 1/54* (2006.01)

(52) U.S. Cl.
    CPC .......... *D06P 1/0012* (2013.01); *D06P 1/5292* (2013.01); *D06P 1/54* (2013.01); *D06P 1/673* (2013.01); *D10B 2101/00* (2013.01); *D10B 2401/06* (2013.01); *D10B 2401/20* (2013.01)

(56) References Cited

FOREIGN PATENT DOCUMENTS

KR   10-2015-0066656 A    6/2015
WO   WO-2015190661 A1 * 12/2015 ............... F21K 2/04

OTHER PUBLICATIONS

Machine Translation of KR20150066656 (Year: 2015).*
Machine Translation of JP2005325459 (Year: 2005).*
Machine Translation of JP3083388 (Year: 2000).*
Jing Zhang et al, Flexible and stretchable mechanoluminescent fiber and fabric, Journal of Materials Chemistry C, Aug. 7, 2017, 8027-8032, 5, The Royal Society of Chemistry.

* cited by examiner

MECHANOLUMINESCENT FIBER AND METHOD OF MANUFACTURING THE SAME

BACKGROUND OF THE INVENTION

Field of the Invention

The present invention relates to a luminescent fiber and, more particularly, a mechanoluminescent fiber.

Description of the Related Art

Mechanical luminescence, that is, light that is produced by applying force to a material can be considered as having little possibility to be applied to industry because the principle of producing light is unclear up till now and there is a fundamental problem that the light is produced by friction or destruction. In order to solve the problem with industrial application, recently, it has been attempted to apply nondestructive mechanical light that is produced by elastic or plastic deformation of some materials, instead of the light that is produced by friction or destruction of a material, to some stress sensors.

However, common UV-cured macromolecules are used as a stress transfer substance that transmits mechanical force to a luminescent material, so it is difficult to repeatedly apply stress, and accordingly, there is a large limit in lifespan. Further, it is very important to control brightness, lifespan, and colors in order to actually apply such mechanical luminescence to industry, but it can be said that there is no study related to color control up till now in other groups due to the absence of brightness and lifespan (or reproducibility).

Eco-friendly displays and mechanoluminescent films that use vibration, wind, etc. in the nature are developed at present, but there is little research related to mechanoluminescence using all motion of people, for example, mechanical motions such as bending and tension of joints or bodies. The material that most easily receive mechanical deformation due to movement of a person is a fiber such as cloth. Accordingly, if a fiber type of mechanoluminescent substance is developed, it is possible to develop a new type of smart fiber with the recent development of IoT.

Meanwhile, as for the luminescent fiber of the related art, most researches addressed a fiber made of an optical fiber or an electroluminescent fibers that produces light when a voltage is applied using organic/inorganic ELs. These methods all require external power source and have difficulty in having external power source that is thin, light, and large in charge capacity.

CITATION LIST

Patent Literature

Patent Literature 1: U.S. Pat. No. 8,207,511

SUMMARY OF THE INVENTION

An object of the present invention is to provide a luminescent fiber that does not require external power source and has improved durability.

The objects of the present invention are not limited to the technical problems described above and other technical objects that are not stated herein will be clearly understood by those skilled in the art from the following specifications.

In order to achieve the objects, an embodiment of the present invention provides a method of manufacturing a mechanoluminescent fiber.

The method of manufacturing a mechanoluminescent fiber includes the steps of: preparing an elastic fiber having a longitudinal groove on the surface thereof; forming a primer layer including a coupling agent on the elastic fiber; filling the groove of the elastic fiber with a mixture of a stress transfer substance and a stress luminescent substance; and forming a capping layer on the elastic fiber by coating the elastic fiber filled with the mixture a stress transfer substance and a stress luminescent substance with a silicon adhesive. The silicon adhesive layer is 3-dimensionally bonded to the elastic fiber and the mixture of a stress transfer substance and a stress luminescent substance, respectively.

DETAILED DESCRIPTION OF THE PREFERRED EMBODIMENTS

Hereinafter, the present invention is described with reference to the accompanying drawings. However, the present invention may be modified in various different ways and is not limited to the embodiments described herein. Further, in the accompanying drawings, components irrelevant to the description will be omitted in order to clearly describe the present invention, and similar reference numerals will be used to describe similar components throughout the specification.

Throughout the specification, when an element is referred to as being "connected with (coupled to, combined with, in contact with)" another element, it may be "directly connected" to the other element and may also be "indirectly connected" to the other element with another element intervening therebetween. Throughout the present specification, unless explicitly described otherwise, "comprising" any components will be understood to imply the inclusion of other components rather than the exclusion of any other components.

Terms used in the present invention are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinafter, embodiments of the present invention are described in detail with reference to the accompanying drawings.

Figure 1:
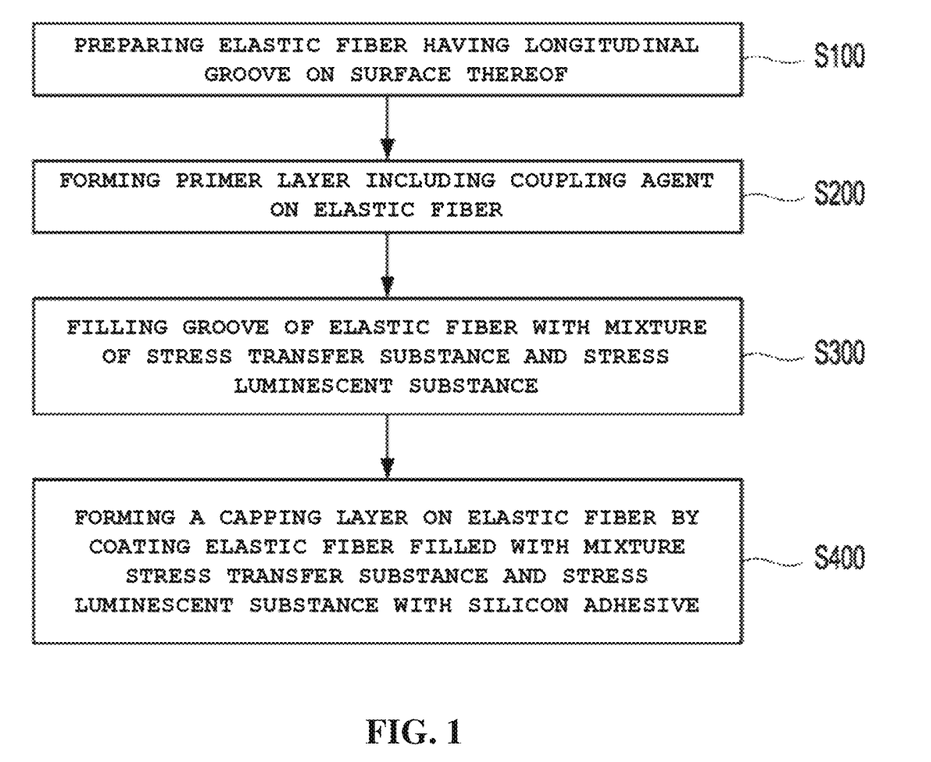
FIG. 1 is a flowchart showing a method of manufacturing a mechanoluminescent fiber according to an embodiment of the present invention.

FIG. 1 is a flowchart showing a method of manufacturing a mechanoluminescent fiber.

Referring to FIG. 1, the method of manufacturing a mechanoluminescent fiber may include the steps of: preparing an elastic fiber having a longitudinal groove on the surface thereof (S100); forming a primer layer including a coupling agent on the elastic fiber (S200); filling the groove of the elastic fiber with a mixture of a stress transfer substance and a stress luminescent substance (S300); and forming a capping layer on the elastic fiber by coating the elastic fiber filled with the mixture a stress transfer substance and a stress luminescent substance with a silicon adhesive (S400).

When a common cylindrical fiber is coated with a luminescent substance, there is a defect that the fiber and the luminescent substance are easily separated. In this case, there is a method of increasing the contact area of the fiber and the luminescent substance in order to improve the bonding force between the fiber and the luminescent substance. To this end, it is preferable to increase the contact area between the luminescent substance and the fiber by using an elastic fiber having a longitudinal groove on the surface thereof.

Referring to FIG. 1, an elastic fiber having a longitudinal groove on the surface thereof is prepared first (S100). For example, the elastic fiber may be manufactured by melt spinning. The elastic fiber having a longitudinal groove on the surface thereof is characterized by having a concave polygonal transverse cross-section.

In general, a fiber is made of organic substances and a mechanoluminescent substance is made of inorganic substances. Since the interfacial adhesion between an organic substance and an inorganic substance is weak, it is preferable to increase the interfacial adhesion by using a coupling agent as a primer in order to compensate for this problem.

Accordingly, a primer layer including a coupling agent is formed on the elastic fiber having a longitudinal groove on the surface thereof (S200). For example, the primer layer may be formed by performing one selected from soaking, spraying, extruding, and coating including rotary screen printing.

The primer layer may include any one or more of silane coupling agents. The silane coupling agent, which is a functional group, may include any one or more of acrylic latex, butyl, epichlorohydrin, fluorocarbon, isoprene, neoprene, nitrile, polysulfide, SBR, hydroxyl terminated silicone, and vinyl terminated silicone.

Next, the elastic fiber is filled with a mixture of a stress transfer substance and a stress luminescent substance (S300). For example, the mixture layer of a stress transfer substance and a stress luminescent substance may be produced by applying a mixture of a stress transfer substance and a stress luminescent substance through a circular hole having a diameter similar to the diagonal length of the elastic fiber having a longitudinal groove on the surface thereof, and then by thermally hardening the mixture.

The stress transfer substance, which is a macromolecular substance optically having transmittance over 80% for a visible light section, for example, may include polydimethylsiloxane (PDMS), silicon, or polyepoxy.

The stress luminescent substance may be one or more of doped $ZnS$, $MgF_2$, $La_2O_2S$, $Y_2O_2S$, $EuD_4TEA$, $SrAl_2O_4$, $SrMgAl_6O_{11}$, $SrCaMgSi_2O_7$, $SrBaMgSi_2O_7$, $Sr_2MgSi_2O_7$, $Ca_2MgSi_2O_7$, $CaYAl_3O_7$, $ZnGa_2O_4$, $MgGa_2O_4$, $Ca_2Al_2SiO_7$, and $ZrO_2$.

The stress luminescent substance may be doped with at least one or more of Cu, Mn, Pb, Cl, Eu, DMMP, Ce, Ho, Dy, Ba, Ca, $Pr^{3+}$, Ti, and Te.

Figure 3:
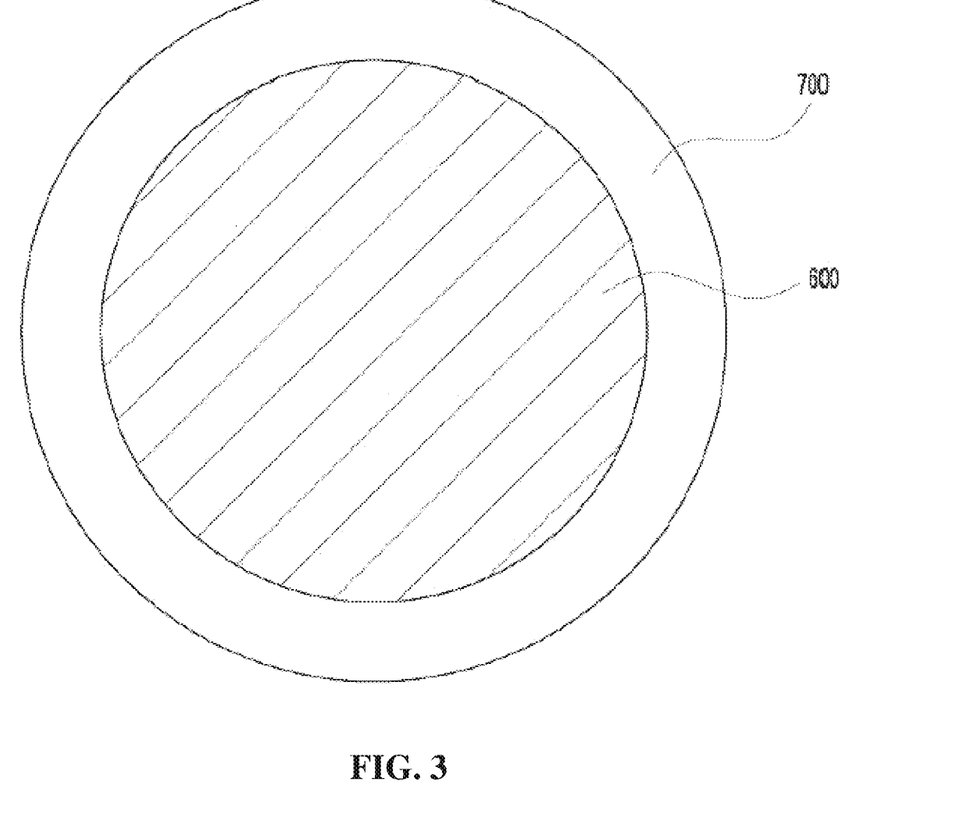
FIG. 3 is a conceptual view showing an exemplary structure of a fluorescent body having a capping layer.

It is possible to expect that the stress luminescent substance has been coated with a capping layer, as shown in FIG. 3. Since most fluorescent bodies are vulnerable to water, they may have a capping layer for preventing deterioration. The capping layer is expected as an amorphous oxide or hydroxide, including aluminum.

When a fiber is coated with a luminescent substance and the used as it is, the luminescent substance may easily come off due to external shock and the fiber coated with the luminescent substance may easily fracture. Accordingly, it is preferable to further apply a capping layer on the fiber coated with the luminescent substance in order to increase the adhesion between the fiber and the luminescent substance and protect the fiber from external shock.

Accordingly, a silicon adhesive layer is formed on the elastic fiber of which the groove filled with the mixture of a stress transfer substance and the stress luminescent substance (S400). For example, the silicon adhesive layer may be produced by applying a silicon adhesive through a circular hole having a diameter similar to the diagonal length of the elastic fiber having a longitudinal groove on the surface thereof, and then by thermally hardening the silicon adhesive.

The silicon adhesive layer is characterized by providing 3-dimensional bonding by being bonded to the elastic fiber and the mixture of a stress transfer substance and a stress luminescent substance, respectively.

Various contaminants may stick to the surface of fibers and they may interfere with the reaction of a fiber and a primer when the primer is applied to the fiber. It is preferable to clean the surfaces of fibers in order to prevent this problem.

For this purpose, the method may further include forming an ethanol layer on the elastic fiber having a longitudinal groove on the surface thereof (not shown) between the preparing of an elastic fiber having a longitudinal groove on the surface thereof (S100) and the forming of a primer layer on the elastic fiber having a longitudinal groove on the surface thereof (S200). For example, the ethanol layer can be formed by soaking the elastic fiber in ethanol.

Figure 2:
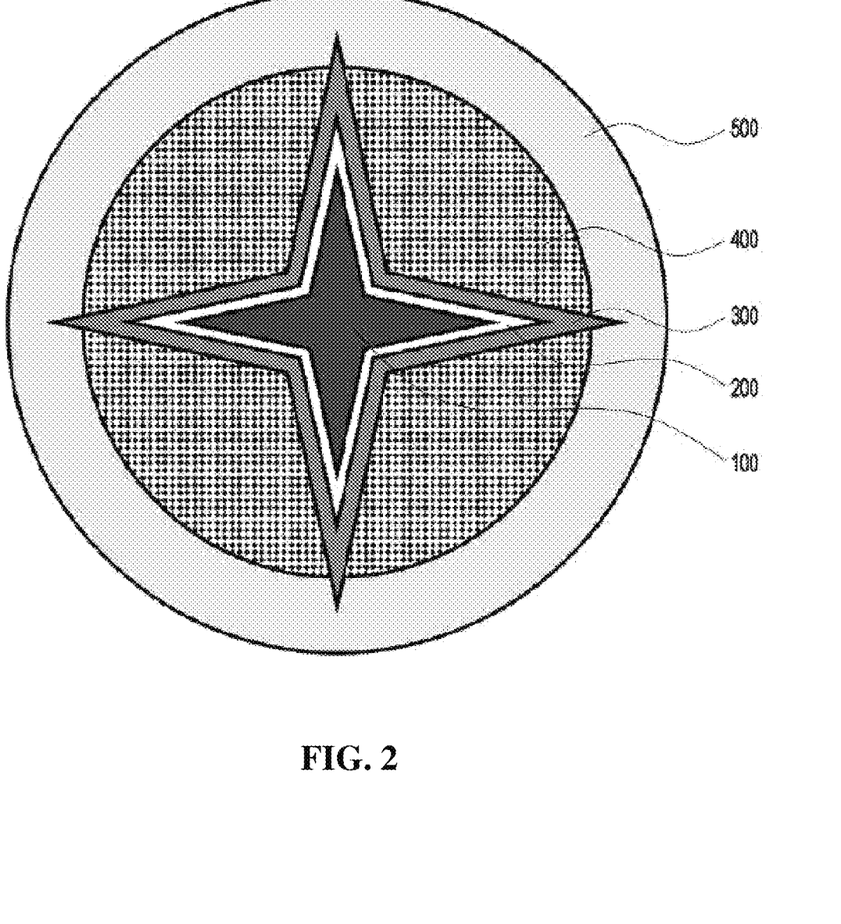
FIG. 2 is a cross-sectional view of the mechanoluminescent fiber according to an embodiment of the present invention.

FIG. 2 is a cross-sectional view of a mechanoluminescent fiber.

Referring to FIG. 2, a mechanoluminescent fiber may include: an elastic fiber 100 having a longitudinal groove on the surface thereof; an ethanol layer 200 on the elastic fiber 100 having a longitudinal groove on the surface thereof; a primer layer 300 including a coupling agent on the ethanol layer; a mixture layer 400 of a stress transfer substance and a stress luminescent substance on the primer layer 300; and a silicon adhesive layer 500 on the mixture layer 400 of a stress transfer substance and a stress luminescent substance.

When a common cylindrical fiber is coated with a luminescent substance, there is a defect that the fiber and the luminescent substance are easily separated. In this case, there is a method of increasing the contact area of the fiber and the luminescent substance in order to improve the bonding force between the fiber and the luminescent substance. To this end, it is preferable to increase the contact area between the luminescent substance and the fiber by using the elastic fiber 100 having a longitudinal groove on the surface thereof.

The elastic fiber 100 having a longitudinal groove on the surface thereof is characterized by having a concave polygonal transverse cross-section including a cross shape and a star shape.

Various contaminants may stick to the surface of fibers and they may interfere with the reaction of a fiber and a primer when the primer is applied to the fiber. It is preferable to clean the surfaces of fibers in order to prevent this problem.

To this end, if necessary, the ethanol layer 200 may be formed on the elastic fiber 100 having a longitudinal groove on the surface thereof.

In general, a fiber is made of organic substances and a mechanoluminescent substance is made of inorganic substances. Since the interfacial adhesion between an organic substance and an inorganic substance is weak, it is preferable to increase the interfacial adhesion by using a coupling agent as a primer in order to compensate for this problem.

The primer layer 300 including a coupling agent may include any one or more of silane coupling agents. The silane coupling agent, which is a functional group, may include any one or more of acrylic latex, butyl, epichlorohydrin, fluorocarbon, isoprene, neoprene, nitrile, polysulfide, SBR, hydroxyl terminated silicone, and vinyl terminated silicone.

In the mixture layer 400 of a stress transfer substance and a stress luminescent substance, the stress transfer substance, which is a macromolecular substance optically having transmittance over 80% for a visible light section, for example, may include polydimethylsiloxane (PDMS), silicon, or polyepoxy.

The stress luminescent substance may include one or more of doped ZnS, $MgF_2$, $La_2O_2S$, $Y_2O_2S$, $EuD_4TEA$, $SrAl_2O_4$, $SrMgAl_6O_{11}$, $SrCaMgSi_2O_7$, $SrBaMgSi_2O_7$, $Sr_2MgSi_2O_7$, $Ca_2MgSi_2O_7$, $CaYAl_3O_7$, $ZnGa_2O_4$, $MgGa_2O_4$, $Ca_2Al_2SiO_7$, and $ZrO_2$.

The stress luminescent substance may be doped with at least one or more of Cu, Mn, Pb, Cl, Eu, DMMP, Ce, Ho, Dy, Ba, Ca, $Pr^{3+}$, Ti, and Te.

As shown in FIG. 3, it can be expected that the stress luminescent substance 600 of the mixture layer 400 of a stress transfer substance and a stress luminescent substance has been coated with a capping layer 700. Since most fluorescent bodies are vulnerable to water, they may have the capping layer 700 for preventing deterioration. The capping layer 700 is expected as an amorphous oxide or hydroxide, including aluminum.

When a fiber is coated with a luminescent substance and the used as it is, the luminescent substance may easily come off due to external shock and the fiber coated with the luminescent substance may easily fracture. Accordingly, it is preferable to further apply a capping layer on the fiber coated with the luminescent substance in order to increase the adhesion between the fiber and the luminescent substance and protect the fiber from external shock. To this end, the silicon adhesive layer 500 is used in the present invention.

The silicon adhesive layer 500 is characterized by providing 3-dimensional bonding by being bonded to the elastic fiber 100 and the mixture 400 of a stress transfer substance and a stress luminescent substance, respectively.

Figure 4:
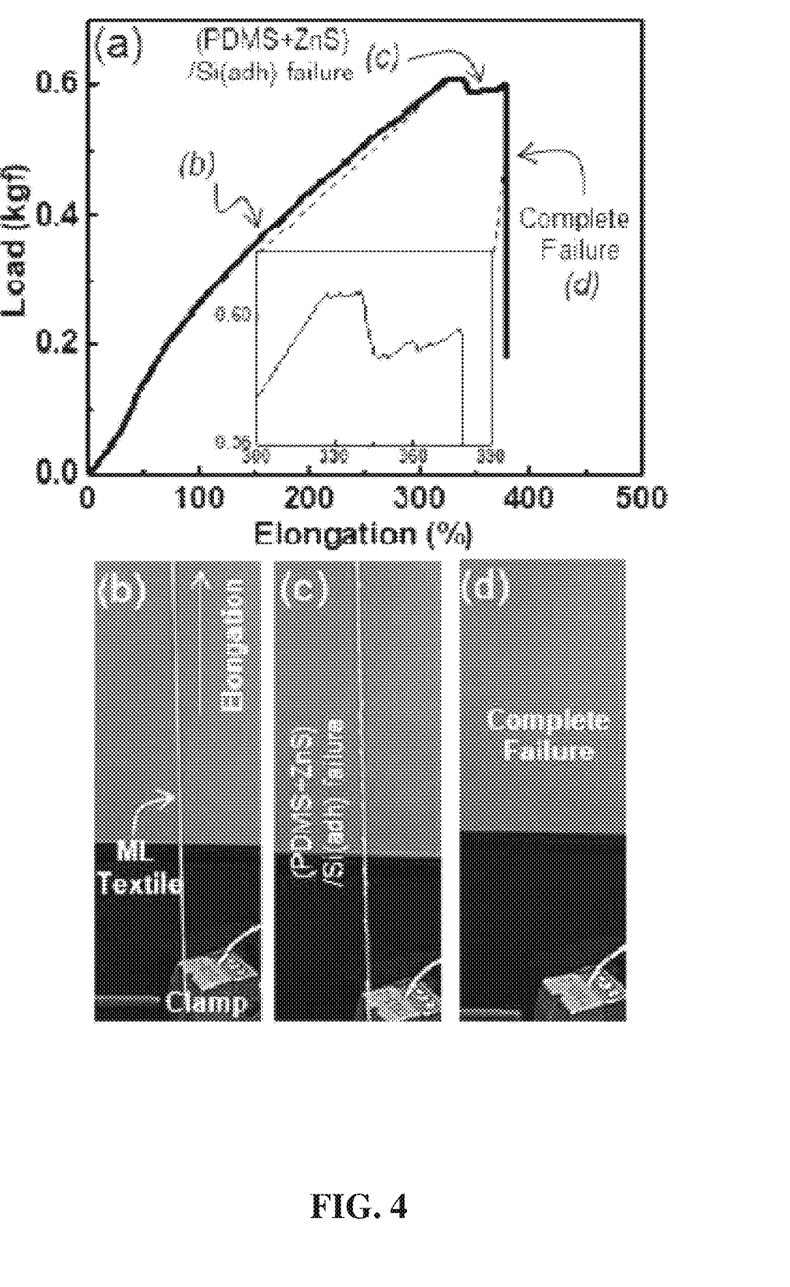
FIG. 4 is a view showing a tension-load test result on the mechanoluminescent fiber according to an embodiment of the present invention.

FIG. 4 shows a tension-load test result on the mechanoluminescent fiber.

Referring to FIG. 4, as shown in (a), it can be seen that the mechanoluminescent fiber manufactured by an embodiment of the present invention fractures at elongation of 380%. Irregular load changes start from elongation of 320%, which is caused by separation and fracture of the mixture of a stress transfer substance and a stress luminescent substance and the silicon adhesive. Accordingly, it can be seen that the mechanoluminescent fiber manufactured by an embodiment of the present invention has high elongation of 320% and high durability.

Figure 5:
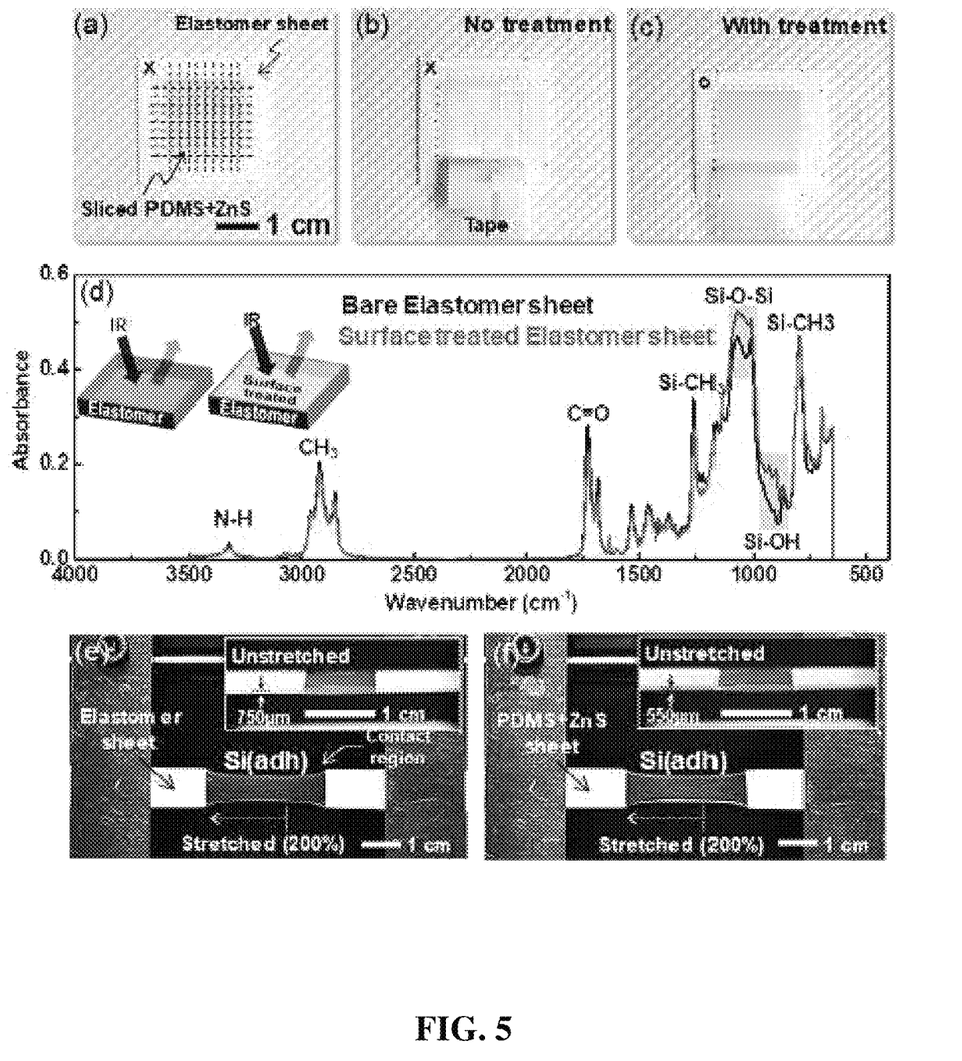
FIG. 5 shows images and a graph showing an effect test result on a coupling agent.

FIG. 5 shows an effect test result on a coupling agent.

Referring to FIG. 3, the case (b) that has not undergone surface treatment with a silane coupling agent and the case (c) that has undergone surface treatment with a silane coupling agent, it can be seen that the adhesion of the mixture of a stress transfer substance and a stress luminescent substance to a substrate is higher in the case that has undergone surface treatment with a silane coupling agent. It can be considered that this is because crosslinking is easily generated due to Si—O—Si bonding and Si—OH bonding in the case that has undergone surface treatment with a silane coupling agent, as can be seen in (d).

Figure 6:
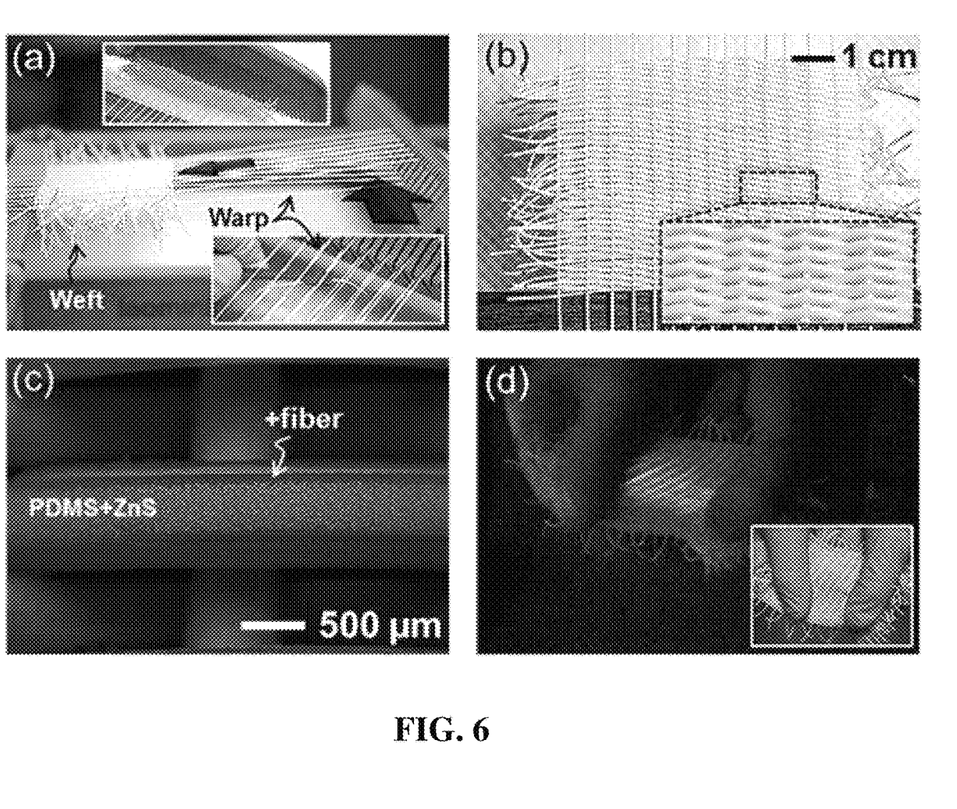
FIG. 6 is a picture of a fabric manufactured using the mechanoluminescent fiber according to an embodiment of the present invention.

FIG. 6 shows a fabric manufactured using a mechanoluminescent fiber.

It can be said that the purpose of manufacturing a mechanoluminescent fiber is to use the fiber in the type of cloth that can be finally used for clothes. Referring to FIG. 6, a mechanoluminescent fabric was manufactured using a mechanoluminescent fiber, as shown in (a) and (b), in order to test possibility of the mechanoluminescent fiber as a fabric. (c) is a microscopic picture of a manufactured mechanoluminescent fabric and from which it can be seen that the fiber and the mixture of a stress transfer substance and a stress luminescent substance were bonded. It can be seen from (d) that a fabric made of a mechanoluminescent fiber emits light when mechanical force is applied. Accordingly, it can be seen that it is possible to manufacture a fabric having a mechanoluminescent function using a mechanoluminescent fiber manufactured by an embodiment of the present invention.

According to an embodiment of the present invention, it is possible to manufacture a mechanoluminescent fiber that does not need external power source.

Further, it is possible to manufacture clothes having a mechanoluminescent characteristic using the mechanoluminescent fiber according to the present invention.

The effects of the present invention are not limited thereto and it should be understood that the effects include all effects that can be inferred from the configuration of the present invention described in the following specification or claims.

The above description is provided as an exemplary embodiment of the present invention and it should be understood that the present invention may be easily modified in other various ways without changing the spirit or the necessary features of the present invention by those skilled in the art. Therefore, the embodiments described above are only examples and should not be construed as being limitative in all respects. For example, the components described as a single part may be divided and the components described as separate parts may be integrated.

The scope of the present invention is defined by the following claims, and all of changes and modifications obtained from the meaning and range of claims and equivalent concepts should be construed as being included in the scope of the present invention.

What is claimed is:

1. A mechanoluminescent fiber comprising:
an elastic fiber having a longitudinal groove on a surface thereof;
a primer layer disposed on the elastic fiber and including a coupling agent;
a mixture layer of a stress transfer substance and a stress luminescent substance filled in the groove of the elastic fiber;
a silicon adhesive layer disposed on the elastic fiber filled with the mixture of a stress transfer substance and a stress luminescent substance; and
a capping layer disposed on a surface of the stress luminescent substance,
wherein the elastic fiber having the longitudinal groove on the surface thereof has a concave polygonal transverse cross-section having a four-pointed star shape,
wherein at least a part of the primer layer covering tips of the four-pointed star shape of the elastic fiber protrudes out of the mixture layer,
wherein the silicon adhesive layer is 3-dimensionally bonded to the part of the primer layer protruding out of the mixture layer and the mixture layer of the stress transfer substance and the stress luminescent substance disposed on the longitudinal groove, and
wherein the capping layer includes amorphous aluminum oxide or amorphous aluminum hydroxide.

2. The mechanoluminescent fiber of claim 1, wherein the coupling agent is a silane coupling agent.

3. The mechanoluminescent fiber of claim 2, wherein a functional group of the silane coupling agent includes any one or more of acrylic latex, butyl, epichlorohydrin, fluorocarbon, isoprene, neoprene, nitrile, polysulfide, SBR, hydroxyl terminated silicone, and vinyl terminated silicone.

4. The mechanoluminescent fiber of claim 1, wherein the stress transfer substance is a macromolecular substance optically having a light transmittance efficiency of over 80% in a visible light section.

5. The mechanoluminescent fiber of claim 1, wherein the stress luminescent substance may include one or more of doped ZnS, $MgF_2$, $La_2O_2S$, $Y_2O_2S$, $EuD_4TEA$, $SrAl_2O_4$, $SrMgAl_6O_{11}$, $SrCaMgSi_2O_7$, $SrBaMgSi_2O_7$, $Sr_2MgSi_2O_7$, $Ca_2MgSi_2O_7$, $CaYAl_3O_7$, $ZnGa_2O_4$, $MgGa_2O_4$, $Ca_2Al_2SiO_7$, and $ZrO_2$.

6. The mechanoluminescent fiber of claim 1, wherein the stress luminescent substance is doped with at least one or more of Cu, Mn, Pb, Cl, Eu, DMMP, Ce, Ho, Dy, Ba, Ca, $Pr^{3+}$, Ti, and Te.

7. The mechanoluminescent fiber of claim 1, further comprising an ethanol layer formed on the elastic fiber having a longitudinal groove on the surface thereof, between the elastic fiber having a longitudinal groove on the surface thereof and the primer layer including a coupling agent.

* * * * *